US010004091B2

(12) United States Patent
Sato

(10) Patent No.: US 10,004,091 B2
(45) Date of Patent: *Jun. 19, 2018

(54) COMMUNICATION APPARATUS, CONTROL METHOD, AND STORAGE MEDIUM

(71) Applicant: CANON KABUSHIKI KAISHA, Tokyo (JP)

(72) Inventor: Ryosuke Sato, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 15/433,889

(22) Filed: Feb. 15, 2017

(65) Prior Publication Data
US 2017/0164415 A1 Jun. 8, 2017

Related U.S. Application Data

(63) Continuation of application No. 15/188,652, filed on Jun. 21, 2016, now Pat. No. 9,609,673.

(30) Foreign Application Priority Data

Jun. 26, 2015 (JP) ................................ 2015-128690

(51) Int. Cl.
H04B 7/00 (2006.01)
H04W 24/00 (2009.01)
H04M 1/00 (2006.01)
H04W 76/02 (2009.01)
H04W 4/00 (2018.01)
(Continued)

(52) U.S. Cl.
CPC ............ H04W 76/02 (2013.01); H04W 4/008 (2013.01); H04W 8/005 (2013.01); H04W 4/023 (2013.01); H04W 88/06 (2013.01)

(58) Field of Classification Search
CPC ....... H04W 4/008; H04W 4/02; H04W 4/021; H04W 4/023; H04W 28/0226; H04W 40/20; H04W 48/04; H04W 64/00; H04W 64/003; H04W 76/00; H04W 76/02; H04W 84/12; H04W 88/02; H04W 88/08;
(Continued)

(56) References Cited

U.S. PATENT DOCUMENTS 6,807,427 B1 * 10/2004 Sakamoto ............... H04W 4/02
455/456.1
9,301,252 B2 * 3/2016 Narasimha ........ H04W 52/0212
(Continued)

Primary Examiner — Quochien B Vuong
(74) Attorney, Agent, or Firm — Canon U.S.A., Inc. IP Division

(57) ABSTRACT

A communication apparatus according to the present invention includes a storage unit that stores, when the communication apparatus is connected to a first wireless network at a predetermined position, information about the predetermined position, a detection unit that detects whether the communication apparatus exists within a predetermined range including the predetermined position, and a transmission unit that transmits predetermined information, for connecting another communication apparatus to the first wireless network, to the another communication apparatus using a second communication system with a lower power consumption than a first communication system used in the first wireless network in response to the detection unit detecting that the communication apparatus exists within the predetermined range.

22 Claims, 13 Drawing Sheets

(51) Int. Cl.
*H04W 8/00* (2009.01)
*H04W 88/06* (2009.01)
*H04W 4/02* (2018.01)

(58) Field of Classification Search
CPC ..... H04W 88/085; H04B 5/0031; H04B 5/02; H04M 1/72572; H04M 2242/30
USPC ... 455/41.1, 41.2, 41.3, 456.1, 456.3, 456.6, 455/552.1, 553.1, 574
See application file for complete search history.

(56) References Cited

U.S. PATENT DOCUMENTS

| | | | |
|---|---|---|---|
| 9,357,352 B1* | 5/2016 | Alharayeri | H04W 4/025 |
| 2013/0217408 A1* | 8/2013 | DiFazio | H04W 64/003 |
| | | | 455/456.1 |
| 2016/0165544 A1* | 6/2016 | Pefkianakis | H04W 52/0254 |
| | | | 370/311 |

* cited by examiner

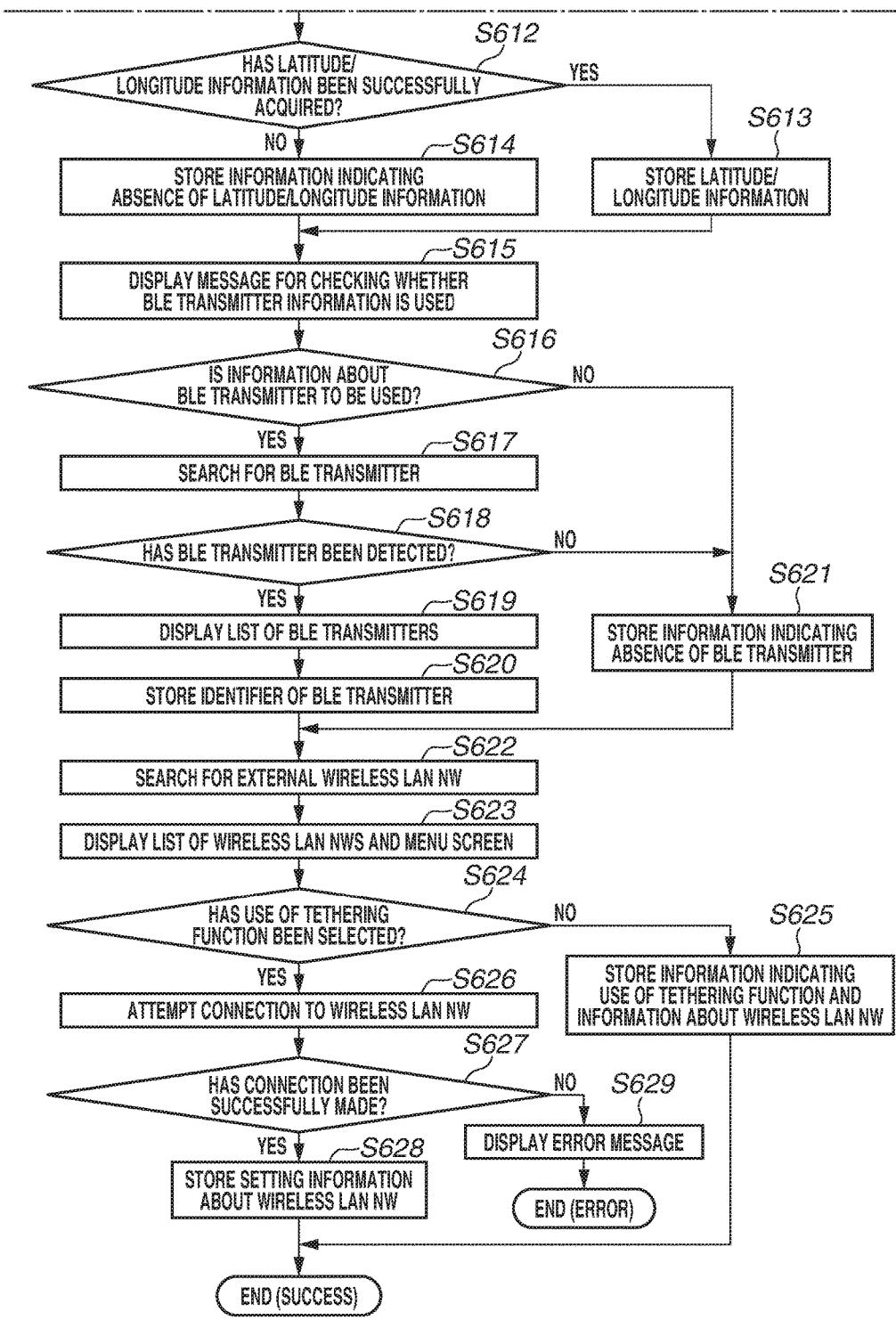

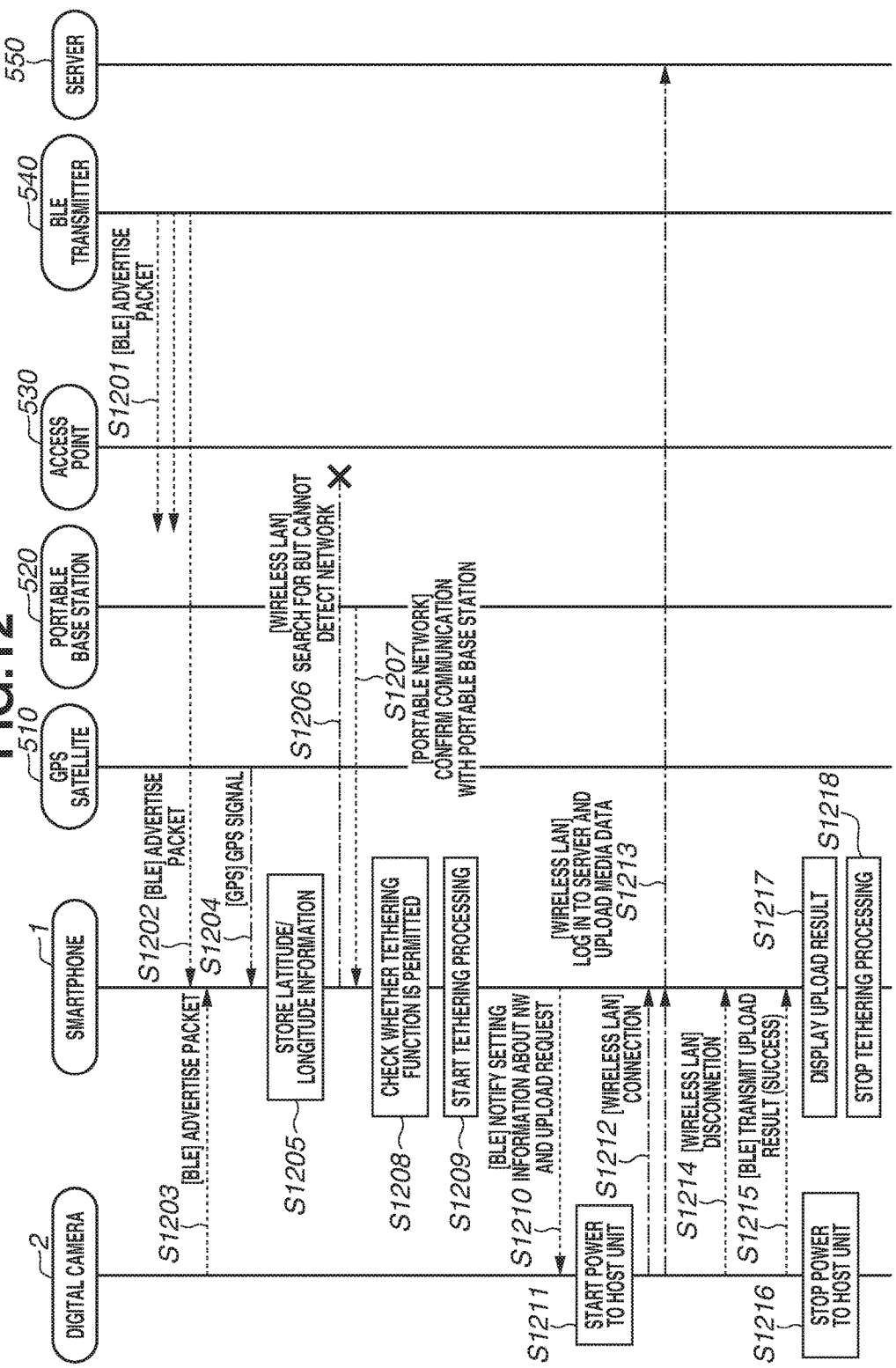

COMMUNICATION APPARATUS, CONTROL METHOD, AND STORAGE MEDIUM

RELATED APPLICATIONS

This application is a Continuation of U.S. patent application Ser. No. 15/188,652 filed on Jun. 21, 2016, which claims the benefit of Japanese Application No. 2015-128690 filed Jun. 26, 2015, which are hereby incorporated by reference herein in their entirety.

BACKGROUND

Field

Aspects of the present invention generally relate to a communication apparatus that notifies information about a network.

Description of the Related Art

In recent years, a base station, which performs wireless local area network (LAN) communication conforming to Institute of Electrical and Electronic Engineers (IEEE) 802.11 series, has been installed in a user's home and a shop. When a user inputs or selects information about a wireless network generated by the base station into a communication apparatus such as a camera, the communication apparatus can perform wireless LAN communication with the base station.

Recently, Bluetooth® Low Energy (BLE) communication capable of communication with lower power consumption than the wireless LAN communication has been standardized, and there has existed a communication apparatus that performs wireless LAN communication and BLE communication. Japanese Patent Application Laid-Open No. 2007-306201 discusses a configuration in which a communication apparatus notifies a partner apparatus of the start of wireless LAN communication via BLE communication and performs the wireless LAN communication between the apparatus and the partner apparatus. With this configuration, power consumption can be reduced because the communication apparatus and the partner apparatus perform only BLE communication with lower power consumption until the wireless LAN communication is started.

When the communication apparatus and the partner apparatus are thus performing the BLE communication to suppress the power consumption, in some cases it may be desired to cause the partner apparatus to connect to a base station different from the communication apparatus. For example, the partner apparatus is a camera, and a user wishes to upload media data from the camera via the base station.

In such a case, to perform wireless LAN communication between the base station installed at a specific location, such as a user's home or a shop, and the partner apparatus, a user needs recognize to be at the specific location where the base station exists.

Further, to cause wireless LAN communication between the base station installed at a specific location, such as a user's home or a shop, and the partner apparatus to be performed, information about a wireless network generated by the base station at the specific location is required. However, it has been bothersome for the user to input or select the information.

SUMMARY

Aspects of the present invention are directed to a technique allowing a communication apparatus to cause another communication apparatus to easily connect to a wireless network at a predetermined location while power consumption is reduced.

According to an aspect of the present invention, a communication apparatus includes a first storage unit configured to store, when the communication apparatus is connected to a first wireless network at a predetermined position, information about the predetermined position, a detection unit configured to detect whether the communication apparatus exists within a predetermined range including the predetermined position, and a transmission unit configured to transmit predetermined information, for connecting another communication apparatus to the first wireless network, to the other-communication apparatus using a second communication system with a lower power consumption than a first communication system used in the first wireless network in response to the detection unit detecting that the communication apparatus exists within the predetermined range.

Further features of aspects of the present invention will become apparent from the following description of exemplary embodiments with reference to the attached drawings.

BRIEF DESCRIPTION OF THE DRAWINGS

FIG. 12 is a communication sequence chart between the apparatuses.

DESCRIPTION OF THE EMBODIMENTS

Figure 1:
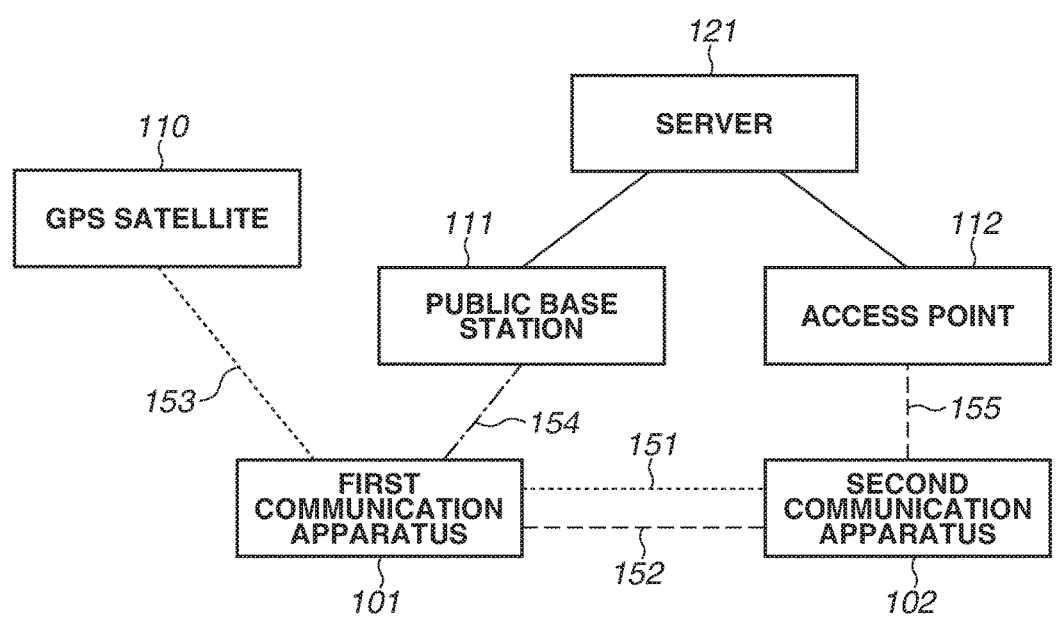
FIG. 1 is a system configuration diagram.

FIG. 1 is a system configuration diagram according to an exemplary embodiment of the present invention. A first communication apparatus 101 performs wireless communication 151 conforming to IEEE802.11 series and wireless communication 152 conforming to Bluetooth® Low Energy (BLE) with a second communication apparatus 102 (another communication apparatus). BLE is a wireless communication system conforming to Bluetooth® ver4.0 standard.

The first communication apparatus 101 can communicate with the second communication apparatus 102, using the wireless communication 152 conforming to BLE, with power consumption lower than when using the wireless communication 151 conforming to IEEE802.11 series. In other words, the wireless communication 151 conforming to IEEE802.11 series has power consumption related to communication higher than that of the wireless communication 152 conforming to BLE. On the other hand, the wireless communication 151 conforming to IEEE802.11 series can be performed at a speed higher than that of the wireless communication 152 conforming to BLE.

The first communication apparatus 101 receives a Global Positioning System (GPS) signal 153 notified from a GPS satellite 110. While only one GPS satellite 110 is illustrated for simplicity, a plurality of (desirably four or more) GPS satellites 110 exists in practice, and the first communication apparatus 101 receives a GPS signal 153 from each of the plurality of GPS satellites 110.

The first communication apparatus 101 also communicates with a public base station 111 via a public network 154. The first communication apparatus 101 can communicate with a server 121 via the public base station 111. The first communication apparatus 101 can also communicate with the second communication apparatus 102 and the server 121 via an access point (hereinafter referred to as AP) 112 serving as a base station.

Meanwhile, the second communication apparatus 102 can communicate with the AP 112 via wireless communication 155 conforming to IEEE802.11 series.

In the present exemplary embodiment, the first communication apparatus 101 will be described as a smartphone, and the second communication apparatus 102 will be described as a digital camera. However, aspects of the present invention are not limited thereto. Each of the first communication apparatus 101 and the second communication apparatus 102 may be an image input apparatus such as an image capturing apparatus (e.g., a still camera or a video camera) or a scanner, may be an image output apparatus such as a printer, a copying machine, or a projector, may be a storage apparatus such as a hard disk drive or a memory apparatus, or may be an information processing apparatus such as a personal computer (PC) or a smartphone.

Figure 2:
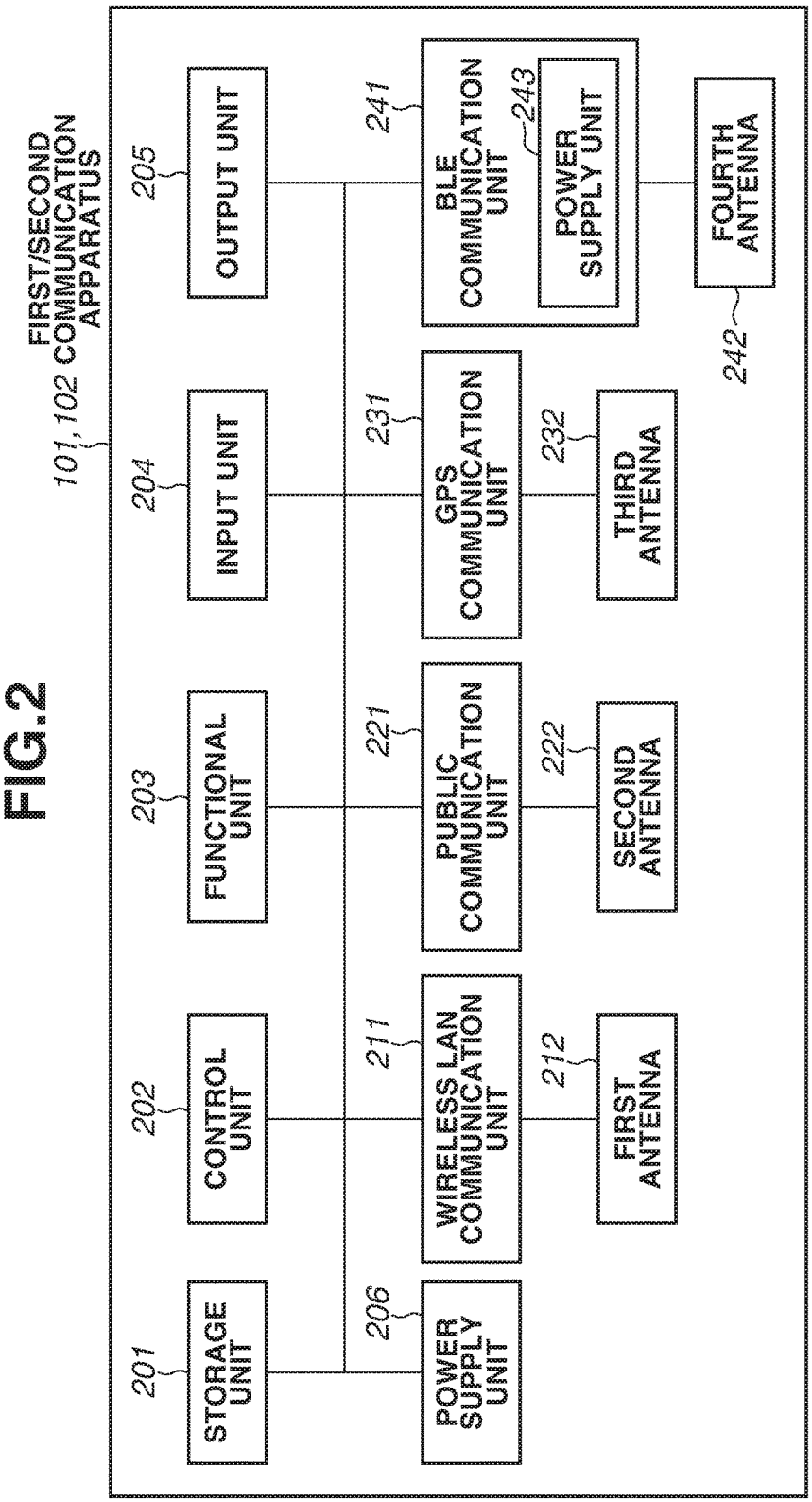
FIG. 2 is a hardware configuration diagram of a communication apparatus and another communication apparatus.

FIG. 2 illustrates a hardware configuration of the first communication apparatus 101.

A storage unit 201 includes a read-only memory (ROM) or a random access memory (RAM), and stores a program for performing various types of operations (described below) and various types of information such as a communication parameter for wireless communication. The storage unit 201 stores media data such as image data and video data. Further, the storage unit 201 may store various types of content data such as document data and music data in addition to the media data.

The storage unit 201 may be a storage medium such as a flexible disk, a hard disk, an optical disk, a magneto-optical disk, a compact disk read-only memory (CD-ROM), a compact disk readable (CD-R), a magnetic tape, a non-volatile memory card, or a digital versatile disk (DVD) other than a memory such as a ROM or a RAM.

A control unit 202 includes a central processing unit (CPU) or a micro-processing unit (MPU), and controls the entire first communication apparatus 101 by executing the program stored in the storage unit 201. The control unit 202 may controls the entire first communication apparatus 101 in cooperation with an operating system (OS) executed by the control unit 202.

The control unit 202 controls a functional unit 203, to perform predetermined processing such as image capturing, printing, and projection. The functional unit 203 is hardware for the first communication apparatus 101 to perform predetermined processing. If the first communication apparatus 101 is a camera, for example, the functional unit 203 is an image capturing unit, and performs image capturing processing. If the first communication apparatus 101 is a printer, for example, the functional unit 203 is a printing unit, and performs print processing. If the first communication apparatus 101 is a projector, for example, the functional unit 203 is a projection unit, and performs projection processing. Data to be processed by the functional unit 203 may be the data stored in the storage unit 201, or may be data to be communicated with an external communication apparatus via a wireless LAN communication unit 211 (described below).

An input unit 204 receives various types of operations from a user. An output unit 205 performs various types of output to the user. The output includes at least one of display on a screen, voice output over a loudspeaker, and vibration output. Both the input unit 204 and the output unit 205 may be implemented by one module, such as a touch panel. A power supply unit 206 supplies power to the entire first communication apparatus 101. The power supply unit 206 may be a battery or a module for obtaining power from a commercial power supply and supplying the obtained power.

The wireless LAN communication unit 211 controls wireless LAN communication conforming to IEEE802.11 series and controls Internet Protocol (IP) communication. The wireless communication unit 211 controls a first antenna 212, to transmit and receive a wireless signal for wireless communication. A public communication unit 221 controls public communication conforming to Long Term Evolution (LTE). Fifth Generation (5G) communication may be used as the public communication. The public communication unit 221 controls a second antenna 222, to transmit and receive a wireless signal for public communication. A GPS communication unit 231 receives the GPS signal 153 notified from each of the plurality of GPS satellites 110 via a third antenna 232.

A BLE communication unit 241 controls BLE communication with low consumed power conforming to BLE. The BLE communication unit 241 controls a fourth antenna 242, to transmit and receive a wireless signal for BLE communication. The BLE communication unit 241 includes a power supply unit 243 independent of the power supply unit 206. Thus, the BLE communication unit 241 can operate independently of other modules. More specifically, even when the power supply unit 206 stops supplying power and operations of the control unit 202 and the wireless LAN communication unit 211 are stopped, the first communication apparatus 101 can perform wireless communication conforming to BLE.

A hardware configuration of the second communication apparatus 102 is substantially similar to that of the first communication apparatus 101, and hence description thereof is not repeated. The second communication apparatus 102 does not include the public communication unit 221, the second antenna 222, the GPS communication unit 231, and the third antenna 232.

Figure 3:
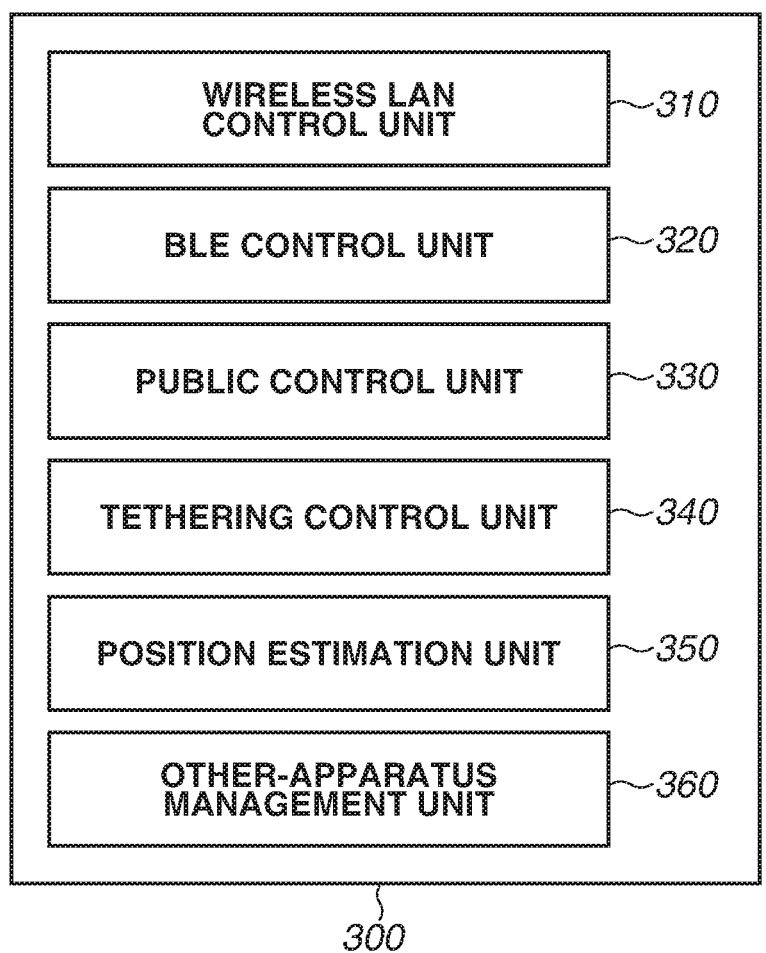
FIG. 3 is a functional block diagram of the communication apparatus.
Figure 4:
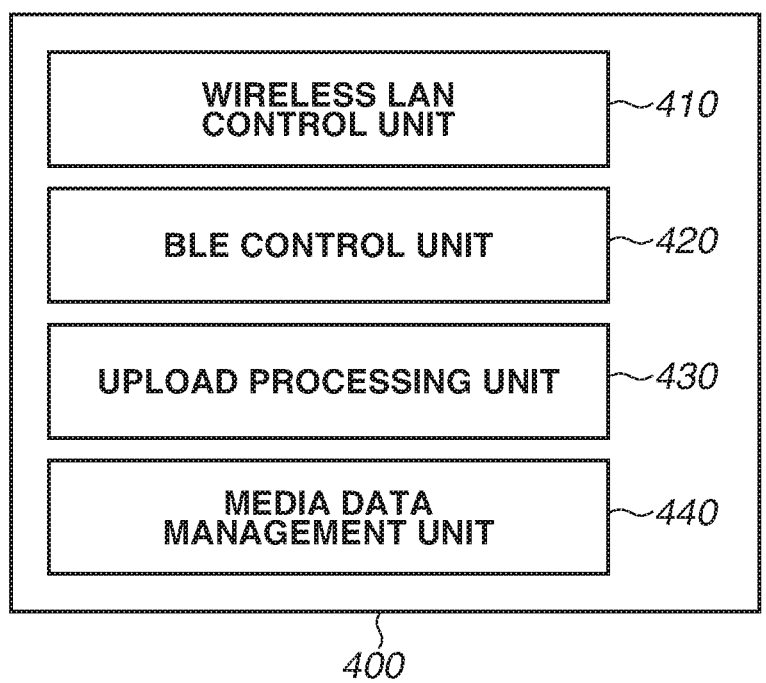
FIG. 4 is a functional block diagram of the other-communication apparatus.

FIG. 3 is a functional block diagram of the first communication apparatus 101. FIG. 4 is a functional block diagram of the second communication apparatus 102. In the present exemplary embodiment, each of functional blocks, described below, is implemented when the control unit 202 in each of the communication apparatuses reads out the program stored in the storage unit 201 in the communication apparatus and executes the read program.

However, aspects of the present invention are not limited thereto. Some or all of the functional blocks, described below, may be implemented by hardware. If the functional blocks are implemented by hardware, a dedicated circuit may be automatically formed on a Field Programmable Gate Array (FPGA) from a program for implementing each of steps by using a predetermined compiler. A gate array circuit may be formed to be implemented as hardware in a similar manner to the FPGA.

A wireless LAN control unit 310 controls wireless LAN communication via the wireless LAN communication unit 211. A BLE control unit 320 controls BLE communication via the BLE communication unit 241. A public control unit 330 controls public communication via the public communication unit 221.

A tethering control unit 340 performs relay processing (tethering processing) between wireless LAN communication via the wireless LAN communication unit 211 and public communication via the public communication unit 221. When the tethering processing is started, the tethering control unit 340 instructs the wireless LAN communication unit 211 to start as an AP. When the instruction is issued, the wireless LAN communication unit 211 newly forms a wireless network, and starts to transmit a beacon including an identifier of the wireless network. When the tethering processing is ended, the tethering control unit 340 instructs the wireless LAN communication unit 211 to stop operating as the AP. When the instruction is issued, the wireless LAN communication unit 211 stops transmitting the beacon.

A position estimation unit 350 estimates a current position of the first communication apparatus 101. The position estimation unit 350 analyzes the GPS signal 153, which has been received from each of the plurality of (desirably four or more) GPS satellites 110 via the GPS communication unit 231, and estimates a current position (latitude/longitude information) of the first communication apparatus 101.

The position estimation unit 350 may estimate the current position of the first communication apparatus 101 based on information about a wireless network existing in the periphery of the image forming apparatus 101 using a Wi-Fi Positioning System (WPS). In such a case, the position estimation unit 350 acquires the information about the wireless network existing in the periphery of the image forming apparatus 101 via the wireless LAN communication unit 211 and transmits the acquired wireless network information to an external apparatus. The external apparatus returns position information indicating a position of the wireless network to the position estimation unit 350. The position estimation unit 350 estimates the current position of the first communication apparatus 101 based on the position information.

The position estimation unit 350 may estimate the current position of the first communication apparatus 101 based on Universally Unique Identifier (UUID) information acquired via the BLE communication unit 241. A UUID is an identifier for identifying a transmission source of the UUID. More specifically, the position estimation unit 350 stores, in the storage unit 201, the UUID and the position information in association with each other, and refers to, when it acquires the UUID, the position information stored in association with the UUID, to estimate the current position of the first communication apparatus 101.

The position estimation unit 350 may estimate the current position of the first communication apparatus 101 using a device such as a barometer, an acceleration sensor, or a communication device using visible light or a sound wave (not illustrated) included in the first communication apparatus 101.

The position estimation unit 350 may estimate the current position of the first communication apparatus 101 based on one or a plurality of estimation methods, described above. In such a case, the current position may be estimated in consideration of the radio field intensity of a signal.

An other-apparatus management unit 360 is a processing unit that registers and manages information about the second communication apparatus 102. The information includes an identifier of the second communication apparatus 102 and information indicating whether the second communication apparatus 102 can perform wireless communication conforming to BLE. The UUID is used as the identifier in the present exemplary embodiment.

Functional blocks in the second communication apparatus 102 will be described below with reference to FIG. 4.

A wireless LAN control unit 410 controls wireless LAN communication via the wireless LAN communication unit 211. A BLE control unit 420 controls BLE communication via the BLE communication unit 241. An upload processing unit 430 transmits the media data stored in the storage unit 201 to an external apparatus such as the server 121 via the wireless LAN control unit 410.

A media data management unit 440 manages the media data stored in the storage unit 201. When the second communication apparatus 102 is a digital camera, the media data managing unit 440 manages an image or a video image, which has been captured by the functional unit 203, as the media data. The media data managing unit 440 stores information indicating whether each of the media data stored in the storage unit 201 has been transmitted to the external apparatus via the upload processing unit 430. The media data that has not been transmitted to the external apparatus via the upload processing unit 430 is managed as un-uploaded data (data not having been uploaded) in the media data management unit 440.

Figure 5:
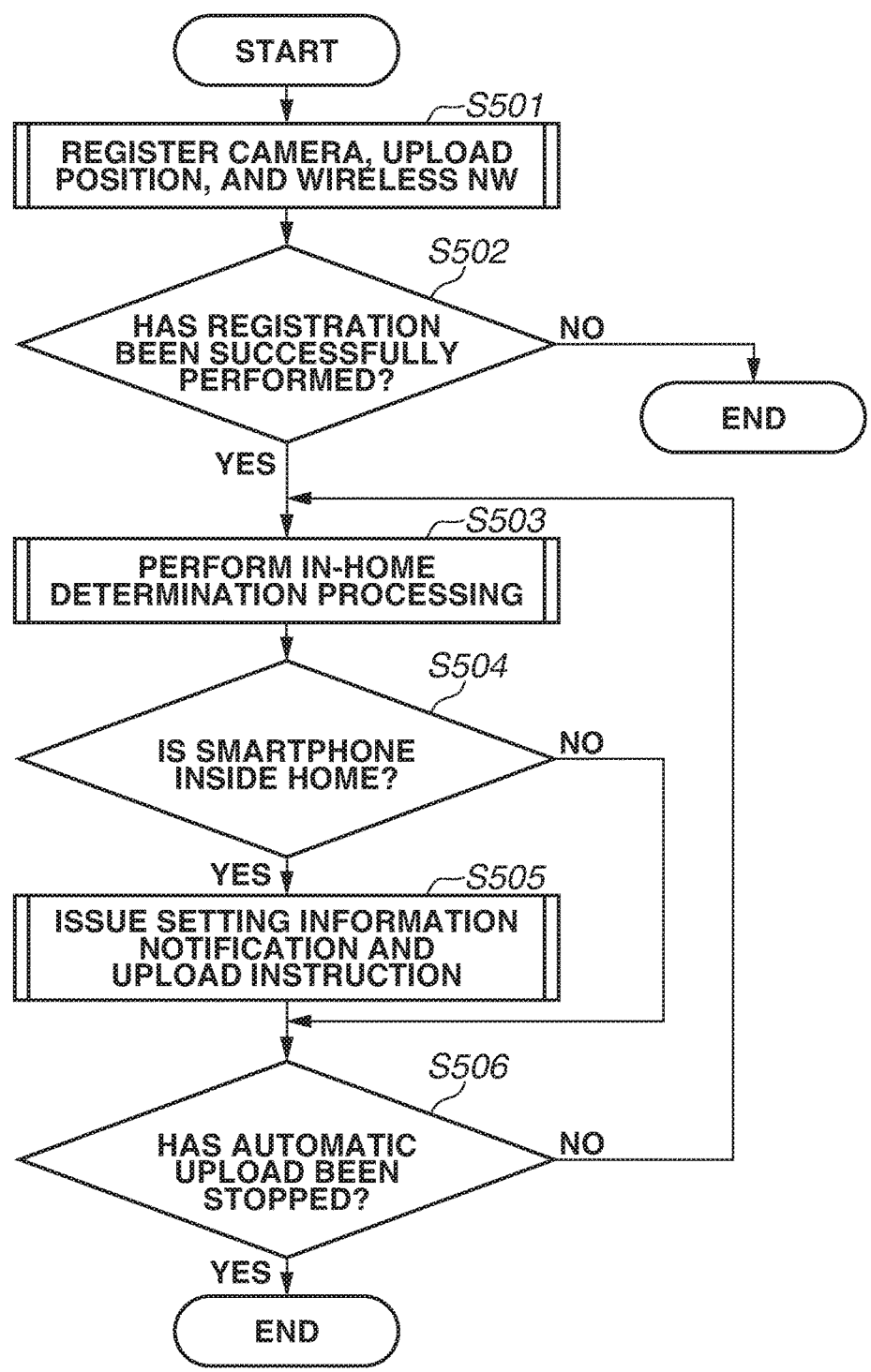
FIG. 5 is a flowchart implemented by the communication apparatus.

FIG. 5 illustrates processing performed when the first communication apparatus 101 controls the second communication apparatus 102 to automatically upload media data stored in the second communication apparatus 102 to the server 121. The processing is implemented when the control unit 202 in the first communication apparatus 101 reads out the program stored in the storage unit 201 in the first communication apparatus 101 and executes the read program.

The first communication apparatus 101 is described below as a smartphone and the second communication apparatus 102 is described below as a digital camera.

In step S501, the smartphone first performs processing for registering a digital camera as a control target and processing for registering a position where upload is automatically performed and a wireless network. The registration processing will be described with reference to FIGS. 6A and 6B.

In step S601, the smartphone displays a screen, on the output unit 205, for prompting a user to designate a digital camera as an upload processing target. A list of digital cameras that have been paired (pairing-processed) with the smartphone via BLE communication managed by the other-apparatus management unit 360, and a menu screen indicating that a digital camera is newly registered are displayed on the screen. The user operates the input unit 204 to select a digital camera displayed on the output unit 205 or a menu for newly registering a digital camera.

In step S602, the smartphone determines whether the user has selected the digital camera paired with the smartphone. If the user has selected the digital camera paired with the smartphone (YES in step S602), then in step S608, the other-apparatus management unit 360 acquires identifier information from the digital camera that has been selected by the user, via the BLE control unit 320, and stores the acquired identifier information. In the present exemplary embodiment, the identifier information about the digital camera is the UUID. However, aspects of the present invention are not limited thereto. For example, address information about wireless LAN communication or BLE communication, a model name of the digital camera, and a nickname set by the user may be used.

If the user has selected the menu for newly registering a digital camera (NO in step S602), then in step S603, the BLE control unit 320 searches for a device existing in the periphery (peripheral device) using BLE. In step S604, the output unit 205 displays information about the detected peripheral devices in a list as a result of the search. All the peripheral devices that have been detected by the search via BLE communication may be displayed in a list, or digital cameras capable of performing upload processing may be selected and displayed by further acquiring types and names of the detected peripheral devices.

The smartphone prompts the user to operate the input unit 204, to select a digital camera which is to perform upload processing from the list displayed on the output unit 205 in step S604. In step S605, the other-apparatus management unit 360 attempts to perform pairing processing using BLE via the BLE control unit 320 on the digital camera selected by the user.

In step S606, the smartphone determines whether the pairing processing has been successfully performed. If the pairing processing has been successfully performed (YES in step S606), then in step S608, the other-apparatus management unit 360 acquires the identifier information from the digital camera that has been selected by the user, via the BLE control unit 320, and stores the acquired identifier information. On the other hand, if the pairing processing has been unsuccessfully performed (NO in step S606), then in step S607, the smartphone displays an error message on the output unit 205, and the processing illustrated in FIG. 6 ends, determining that the registration processing has been unsuccessfully performed.

In step S608, when the processing for acquiring and storing the identifier information of the digital camera is completed, then in step S609 to S614, the position estimation unit 350 attempts to acquire current position information about the smartphone via the GPS communication unit 231. The position estimation unit 350 attempts to acquire latitude/longitude information as the position information.

Processing for acquiring the position information will be specifically described below.

In step S609, the position estimation unit 350 first determines whether the GPS communication unit 231 has already been started. If the GPS communication unit 231 has already been started (YES in step S609), the processing proceeds to step S611. On the other hand, if the GPS communication unit 231 has not been started yet (NO in step S609), then in step S610, the position estimation unit 350 starts the GPS communication unit 231.

In step S611, the GPS communication unit 231 attempts to acquire the latitude/longitude information. In step S612, it is determined as to whether the latitude/longitude information has been successfully acquired. If the latitude/longitude information has been successfully acquired (YES in step S612), then in step S613, the other-apparatus management unit 360 stores the latitude/longitude information as a home position. On the other hand, if the latitude/longitude information has been unsuccessfully acquired (NO in step S612), then in step S614, the other-apparatus management unit 360 stores information indicating the absence of the latitude/longitude information about a user's home.

In step S615, the smartphone then displays a message for prompting the user to select whether information about a BLE transmitter is used on the output unit 205 as a method for determining the home position. In step S616, the smartphone determines whether the user has selected using the information about the BLE transmitter as the method for determining the home position by operating the input unit 204. If it is determined that the user uses the information about the BLE transmitter (YES in step S616), the processing proceeds to step S617. In step S617, the BLE control unit 320 searches for the BLE transmitter with which the smartphone can communicate using BLE. In step S618, the smartphone determines whether the BLE transmitter has been detected as a result of the search. If the BLE transmitter has been detected (YES in step S618), the processing proceeds to step S619. In step S619, the output unit 205 displays the information about the detected BLE transmitters in a list.

If the user operates the input unit 204 to select the BLE transmitter, then in step S620, the other-apparatus management unit 360 stores an identifier (UUID) of the selected BLE transmitter, assuming that the BLE transmitter is installed at a user's home.

On the other hand, if it is determined that the user does not use the information about the BLE transmitter (NO in step S616), the processing proceeds to step S621. In step S621, the other-apparatus management unit 360 stores information indicating the absence of the BLE transmitter set at the user's home. If the BLE transmitter has not been detected as a result of the search for the BLE transmitter (NO in step S618), then in step S621, the other-apparatus management unit 360 stores the information indicating the absence of the BLE transmitter set at the user's home.

In step S622, the wireless LAN control unit 310 searches for an external wireless LAN network existing in the periphery. In the present exemplary embodiment, the wireless LAN network is a wireless network that performs wireless communication conforming to IEEE802.11 series. In step S623, the output unit 205 displays a list of detected wireless LAN networks and a menu screen indicating that a tethering function of the smartphone is used.

In step S624, the smartphone determines whether the user has selected, by operating the input unit 204, either the found external wireless LAN network or the tethering function of the smartphone to perform processing for uploading media data. If the external wireless LAN network is used, the wireless LAN network to be used is designated.

If the use of the tethering function of the smartphone has been selected (NO in step S624), the processing proceeds to step S625. In step S625, the other-apparatus management unit 360 stores information indicating the use of the tethering function of the smartphone in the upload processing. Further, the other-apparatus management unit 360 stores information about the wireless LAN network generated by the smartphone. The registration processing illustrated in FIG. 6 successfully ends.

On the other hand, if any one of the wireless LAN networks has been selected (YES in step S624), then in step S626, the wireless LAN control unit 310 attempts to make connection to the selected wireless LAN network. In step S627, the smartphone determines whether the connection has been successfully established. If the connection has been successfully established (YES in step S627), the processing proceeds to step S628. In step S628, the other-apparatus management unit 360 stores setting information about the wireless LAN network as wireless LAN network information to be used in automatic upload processing. The setting information to be stored includes a network identifier, an encryption system, an encryption key, an authentication system, and an authentication key that are used in the wireless LAN network. The network identifier is a Service Set Identifier (SSID), for example. The other-apparatus management unit 360 may further store a Basic Service Set Identifier (BSSID) as the setting information. The setting information need not include all elements described above, but may include any one or more of the elements.

Figure 7:
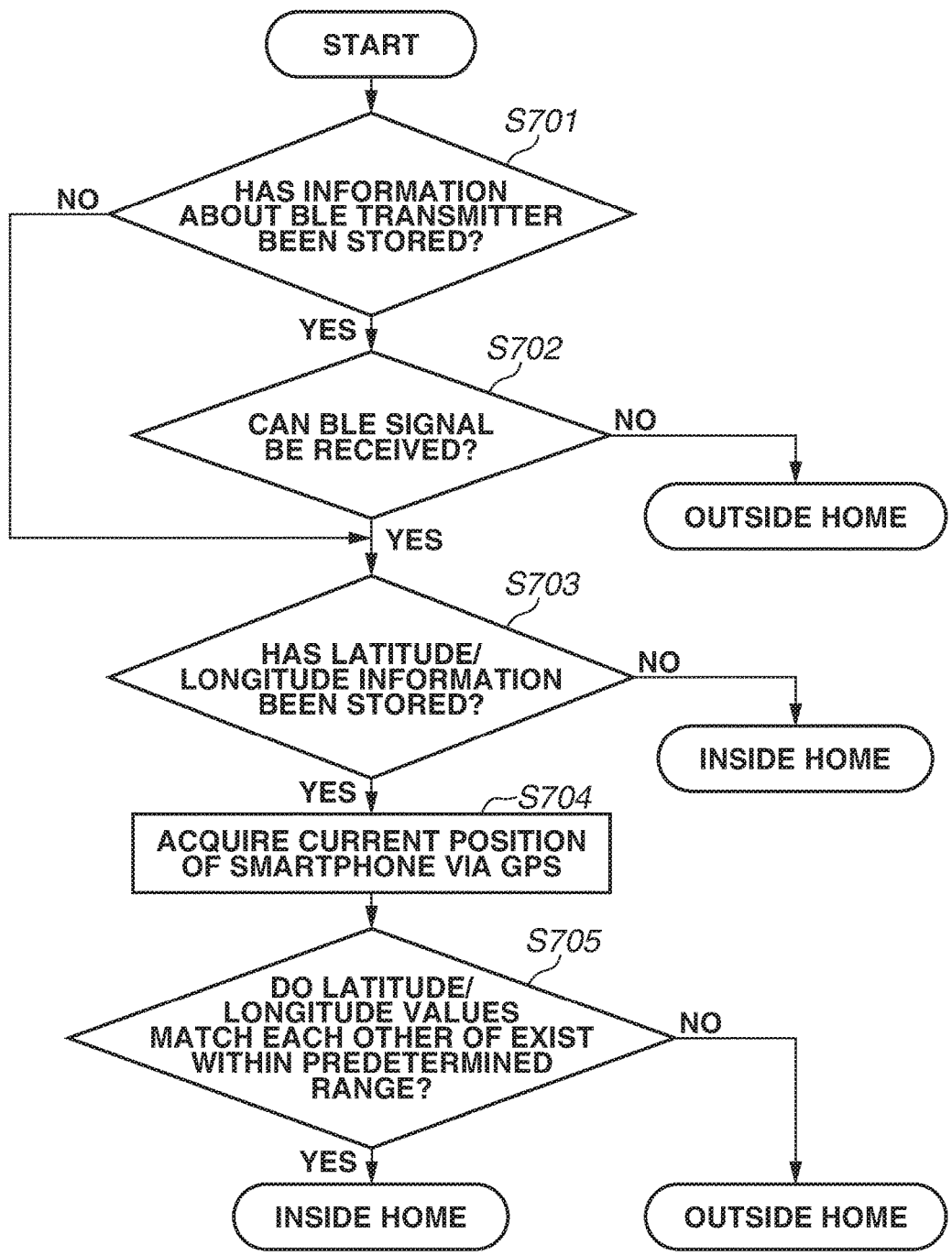
FIG. 7 is a flowchart implemented by the communication apparatus.

When processing for storing the setting information about the wireless LAN network is completed, search and registration processing illustrated in FIG. 7 successfully ends.

On the other hand, if the wireless LAN control unit 310 has failed to establish a connection to the selected wireless LAN network (NO in step S627), the processing proceeds to step S629. In step S629, the smartphone displays an error message on the output unit 205. The processing illustrated in FIG. 7 ends, determining that the smartphone has unsuccessfully performed the registration processing. In such a case, the other-apparatus management unit 360 may discard information about the digital camera, position information, and information about the BLE transmitter that have been stored in the processing illustrated in FIG. 6. In other words, the smartphone does not register the information about the digital camera, the position information, and the information about the BLE transmitter.

Figure 6:
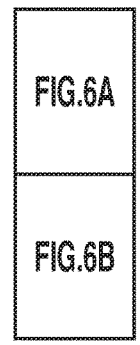
FIG. 6 (consisting of FIGS. 6A and 6B) is a flowchart implemented by the communication apparatus.
Figure 6A:
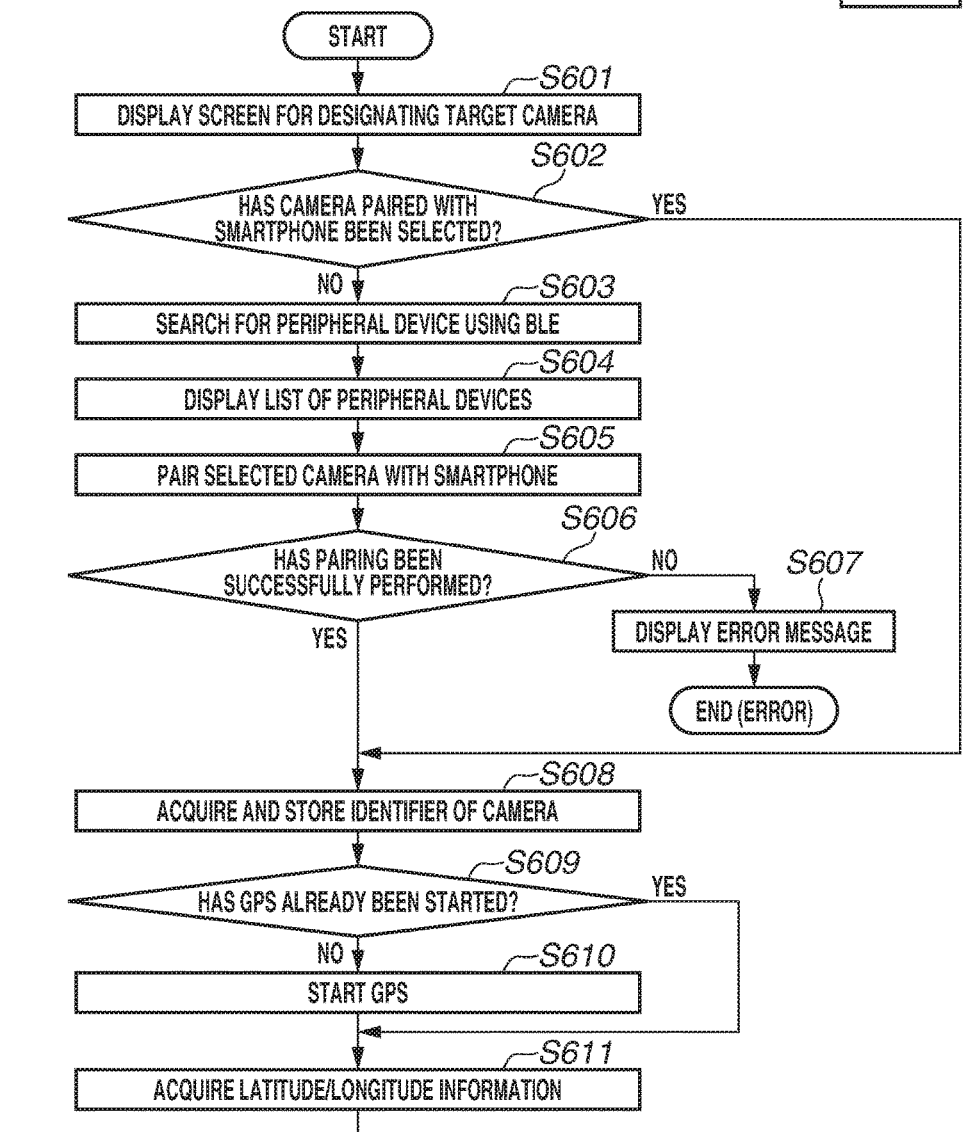

Referring back to FIG. 5, in step S502, the smartphone determines whether the registration processing illustrated in FIG. 6 has been successfully performed. If the registration processing has been unsuccessfully performed (NO in step S502), the processing illustrated in FIG. 5 ends. On the other hand, if the registration processing has been successfully performed (YES in step S502), the processes from step S503 to step S506 are repeated until the automatic upload processing is stopped by a user operation (YES in step S506).

In step S503, the smartphone determines whether the current position is within a predetermined range including a home position serving as the upload position that has been registered in step S501. This process is referred to as in-home determination processing. Details of the in-home determination processing will be specifically described with reference to FIG. 7.

When the in-home determination processing is started, then in step S701, the other-apparatus management unit 360 determines whether the information about the BLE transmitter has been stored in step S620. If the BLE transmitter information has not been stored (NO in step S701), the processing proceeds to step S703.

On the other hand, if the BLE transmitter information has been stored (YES instep S701), the processing proceeds to step S702. In step S702, the position estimation unit 350 determines whether the BLE signal emitted by the BLE transmitter can be received via the BLE control unit 320.

If the BLE signal cannot be received (NO in step S702), the position estimation unit 350 determines that the smartphone is positioned outside the home, and the processing ends. In such a manner, it can be determined that the smartphone is positioned outside the home without using a GPS by using BLE signal. As a result, the power consumption can be suppressed.

On the other hand, if the BLE signal can be received (YES in step S702), the processing proceeds to step S703. In step S703, the other-apparatus management unit 360 determines whether the latitude/longitude information about the home has been stored in step S613. If the latitude/longitude information has not been stored (NO in step S703), the position estimation unit 350 determines that the smartphone is positioned inside the home, and the processing ends.

If the latitude/longitude information has been stored (YES in step S703), the processing proceeds to step S704. In step S704, the position estimation unit 350 obtains the current position (latitude/longitude) of the smartphone via the GPS communication unit 231. More specifically, the position estimation unit 350 receives the GPS signal 153 from each of the plurality of (desirably four or more) GPS satellites, and performs predetermined calculation to obtain the current position (latitude/longitude) of the smartphone. In step S705, the position estimation unit 350 compares respective values of the obtained latitude/longitude and the latitude/longitude stored in step S613, and determines whether both the values match each other or exist within a predetermined range. If both the values match each other or exist within the predetermined range (YES in step S705), it is determined that the smartphone is positioned inside the home, and the processing ends. If the values of the obtained latitude/longitude and the latitude/longitude stored in step S613 are not within the predetermined range (NO in step S705), it is determined that the smartphone is positioned outside the home, and the processing ends.

Thus, it is determined whether the smartphone is inside the home, i.e., within a predetermined range including the home position that has been registered in step S501.

Referring back to FIG. 5, in step S504, if it is determined that the smartphone is inside the home (YES in step S504) as a result of the determination in step S503, the processing proceeds to step S505. In step S505, the smartphone notifies the digital camera registered in step S608, of the setting information about the wireless LAN network, which has been generated by the wireless LAN control unit 310, while instructing the digital camera to upload media data. If it is determined that the smartphone is inside the home also when the process in step S503 has been performed last time, the setting information notification and the upload instruction may be omitted. More specifically, it is determined that the smartphone exists within a predetermined range including a registered position a plurality of times. If the determination has been made, the setting information notification and the upload instruction are not issued. In such a manner, if the user stays at home, the smartphone can be prevented from continuously issuing upload instruction, resulting in power saving.

Details of processing performed when the setting information notification and the upload instruction are issued (in step S505) will be described below with reference to FIG. 8.

In step S801, the BLE control unit 320 searches for the digital camera with the identifier, which has been stored in step S608, via BLE communication. In step S802, if the digital camera with the stored identifier has not been detected (NO in step S802), the processing proceeds to step S803. In step S803, the smartphone displays an error message on the output unit 205. The processing illustrated in FIG. 8 ends.

On the other hand, if the digital camera with the stored identifier has been detected (YES in step S802), the processing proceeds to step S804. In step S804, the other-apparatus management unit 360 determines whether information about an external wireless LAN network has been stored in step S628 as the wireless LAN network information to be used in the automatic upload processing.

If the information about the external wireless LAN network has not been stored in step S628, i.e., if the user has selected the use of the tethering function, the processing proceeds to step S808. On the other hand, the information about the external wireless LAN network has been stored (YES in step S804), the processing proceeds to step S805. In step S805, the wireless LAN control unit 310 performs processing for searching for the wireless LAN network.

In step S806, if the wireless LAN network has been detected as a result of the search processing (YES in step S806), the processing proceeds to step S807. In step S807, the BLE control unit 320 notifies the digital camera of an upload request notification including setting information about the wireless LAN network via BLE communication. In the present exemplary embodiment, the setting information about the wireless LAN network includes an SSID, a BSSID, an encryption system, an encryption key, an authentication system, and authentication key. The setting information need not include all the above-described elements. Any one or more of the elements may be included.

On the other hand, if the wireless LAN network has not been detected (NO in step S806), the processing proceeds to step S808. In step S808, the public control unit 330 determines whether public communication can be performed. If it is determined that public communication cannot be performed (NO in step S808), then in step S809, the smartphone displays an error message on the output unit 205, and the processing illustrated in FIG. 9 ends. An example of a case where public communication cannot be performed is a case where the smartphone does not have any reception of the public base station 111.

If it is determined that public communication can be performed (YES in step S808), the processing proceeds to step S810. In step S810, the smartphone displays on the output unit 205 a message asking the user if the user wishes to perform automatic upload processing of the digital camera using the tethering function. In step S811, the smartphone determines whether the user operates the input unit 204 to permit the upload using the tethering function. If the upload using the tethering function has not been permitted (NO in step S811), the processing illustrated in FIG. 9 ends. On the other hand, if the upload using the tethering function has been permitted (YES in step S811), the processing proceeds to step S812.

The display and the user operation may be omitted. In this case, steps S810 to S811 are omitted, and the processing proceeds from step S808 to S812.

In step S812, the wireless LAN control unit 310 generates a wireless LAN network as a base station, an AP in the present exemplary embodiment. In step S813, the tethering control unit 340 starts tethering (relay) processing between the communication in the wireless LAN network, which has been generated by the wireless LAN control unit 310, and the public communication to be controlled by the public control unit 330.

In step S814, the BLE control unit 320 then notifies the digital camera of the upload request notification including the setting information about the wireless LAN network generated by the wireless LAN control unit 310 via BLE communication.

In step S815, the BLE control unit 320 waits for an upload result notification to be transmitted via BLE communication from the digital camera and receives the notification when a request to upload the media data is transmitted to the digital camera. In step S816, the smartphone displays on the output unit 205 the success or failure of automatic upload processing indicated in the notification. In step S817, the smartphone then determines whether the wireless LAN control unit 310 has generated the wireless LAN network in step S812. If the wireless LAN control unit 310 has generated the wireless LAN network (YES in step S817), the processing proceeds to step S818. In step S818, the wireless LAN control unit 310 ends the wireless LAN network.

In such a manner, the smartphone issues the notification of the setting information and the instruction to upload the media data to the digital camera that has been registered in step S608. Only the setting information notification may be issued without the upload instruction being issued. The smartphone may transmit a signal for tuning on the power to a main body of the digital camera, which has been registered in step S608, or the wireless LAN communication unit 211 to the digital camera. By the digital camera performing media data upload when the digital camera has received the setting information or the above-described signal, a similar effect can be obtained.

When processing for issuing the upload instruction in step S505 is completed, then in step S506, the smartphone determines whether the user has performed an operation for stopping the automatic upload processing using the input unit 204. If the user has not performed the stop operation (NO in step S506), the smartphone repeats processes in steps S503 to S505 again. If the user has performed the stop operation (YES in step S506), the processing illustrated in FIG. 5 ends.

Processing performed when the digital camera has received the request to upload the media data from the smartphone will be described below with reference to a flowchart of FIG. 9. The processing is implemented when the control unit 202 in the digital camera reads out the program stored in the storage unit 201 in the digital camera and executes the read program.

In step S901, the BLE control unit 420 in the digital camera receives the upload request notification transmitted by the smartphone. Then in step S902, the BLE control unit 420 determines whether the power supply unit 206 supplies power to the entire digital camera when the BLE control unit 420 receives the upload request notification. If the power is not supplied to the entire digital camera (NO in step S902), then in step S903, the power supply unit 206 starts to supply power to the entire digital camera. That is, the power to the digital camera main body is turned on.

In step S904, the media data management unit 440 then determines whether unsent media data, which has not been transmitted to the server 121 via the upload processing unit 430, exists in the storage unit 201. If the unsent media data does not exist (NO in step S904), then in step S905, the BLE control unit 420 transmits an upload result notification indicating that there exists no file to be uploaded to the smartphone via BLE communication. Then the processing proceeds to step S912.

When there exists no file to be updated, the power to the digital camera main body need not be turned on even if the upload request notification is received. In such a manner, the power consumption of the digital camera can be kept lower.

On the other hand, if the unsent media data exists (YES in step S904), the processing proceeds to step S906. In step S906, the wireless LAN control unit 410 attempts to establish a connection to the wireless LAN network notified from the smartphone. In step S907, it is determined as to whether the connection to the wireless LAN network has been successfully established. If the wireless LAN control unit 410 fails to establish connection to the wireless LAN network (NO in step S907), the processing proceeds to step S908. In step S908, the BLE control unit 420 transmits an upload result notification indicating that automatic upload processing has been unsuccessfully performed to the smartphone via BLE communication.

On the other hand, if the connection to the wireless LAN network has been successfully performed (YES in step S907), then in step S909, the upload processing unit 430 transmits the unsent media data to the server 121 via the wireless LAN control unit 410. Then in step S910, it is determined as to whether all the unsent media data have been transmitted to the server 121. If all the unsent media data has been transmitted to the server 121 (YES in step S910), the processing proceeds to step S911. In step S911, the BLE control unit 420 transmits an upload result notification indicating that the automatic upload processing has been successfully performed to the smartphone via BLE communication.

If all the unsent media data has been unsuccessfully transmitted to the server 121 (NO in step S910), the processing proceeds to step S908. In step S908, the BLE control unit 420 transmits an upload result notification indicating that the automatic upload processing has been unsuccessfully performed to the smartphone via BLE communication.

In step S912, the BLE control unit 420 determines whether the power to the digital camera main body has been turned on in step S903. If the power to the digital camera main body has been turned on (YES in step S912), then in step S913, the power supply unit 206 stops supplying the power to the entire digital camera. That is, the power to the digital camera main body is turned off.

In such a way, the digital camera uploads the media data to the server 121 in response to the upload request from the smartphone.

A communication sequence between the first communication apparatus 101 (smartphone) and the second communication apparatus 102 (digital camera), described above, will be described with reference to FIGS. 10 to 12.

Figure 10:
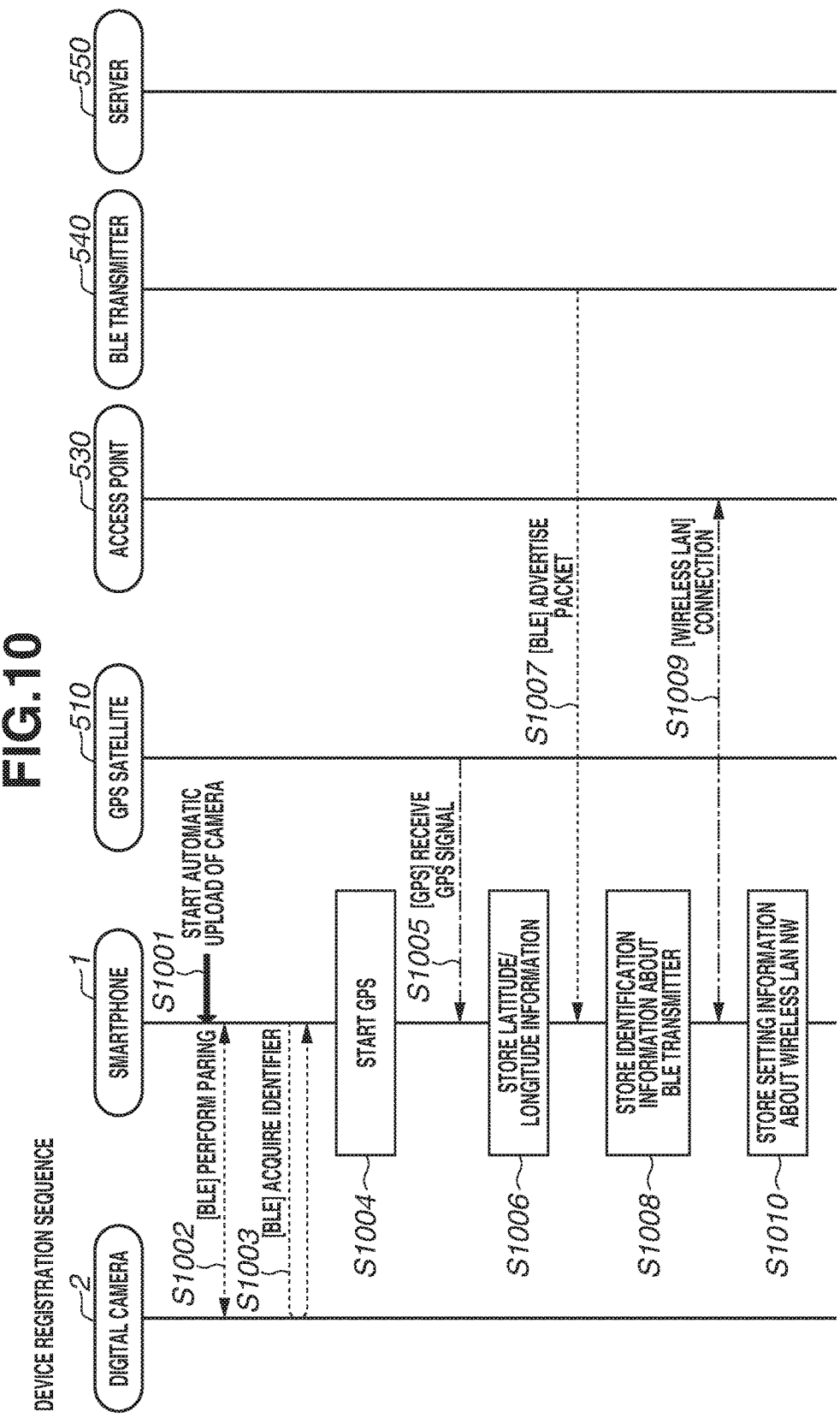
FIG. 10 is a communication sequence chart between the apparatuses.

FIG. 10 illustrates a communication sequence related to registration processing performed when the user operates the input unit 204 in the smartphone to start the automatic upload processing of the digital camera.

In step S1001, the user operates the input unit 204 in the smartphone to start the automatic upload processing of the digital camera. Then in step S1002, the BLE control unit 320 in the smartphone performs pairing processing using BLE with the digital camera. In step S1003, the BLE control unit 320 in the smartphone obtains an identifier (UUID) of the digital camera using BLE communication.

In step S1004, the position estimation unit 350 in the smartphone then starts a GPS function. In step S1005, the position estimation unit 350 in the smartphone receives the GPS signal 153 transmitted by the GPS satellite 110. In step S1006, the position estimation unit 350 in the smartphone calculates latitude/longitude from the received GPS signal 153, and the other-apparatus management unit 360 in the smartphone stores the obtained latitude/longitude. In step S1007, the BLE control unit 320 in the smartphone then receives a BLE Advertise packet transmitted by a BLE transmitter 540. In step S1008, the other-apparatus management unit 360 in the smartphone stores a UUID included in the same message as identifier information about the BLE transmitter 320. In step S1009, the wireless LAN control unit 310 in the smartphone then performs processing for connection between the AP 112 and the wireless LAN. In step S1010, the other-apparatus management unit 360 stores setting information about a wireless LAN network generated by the AP 112.

Figure 11:
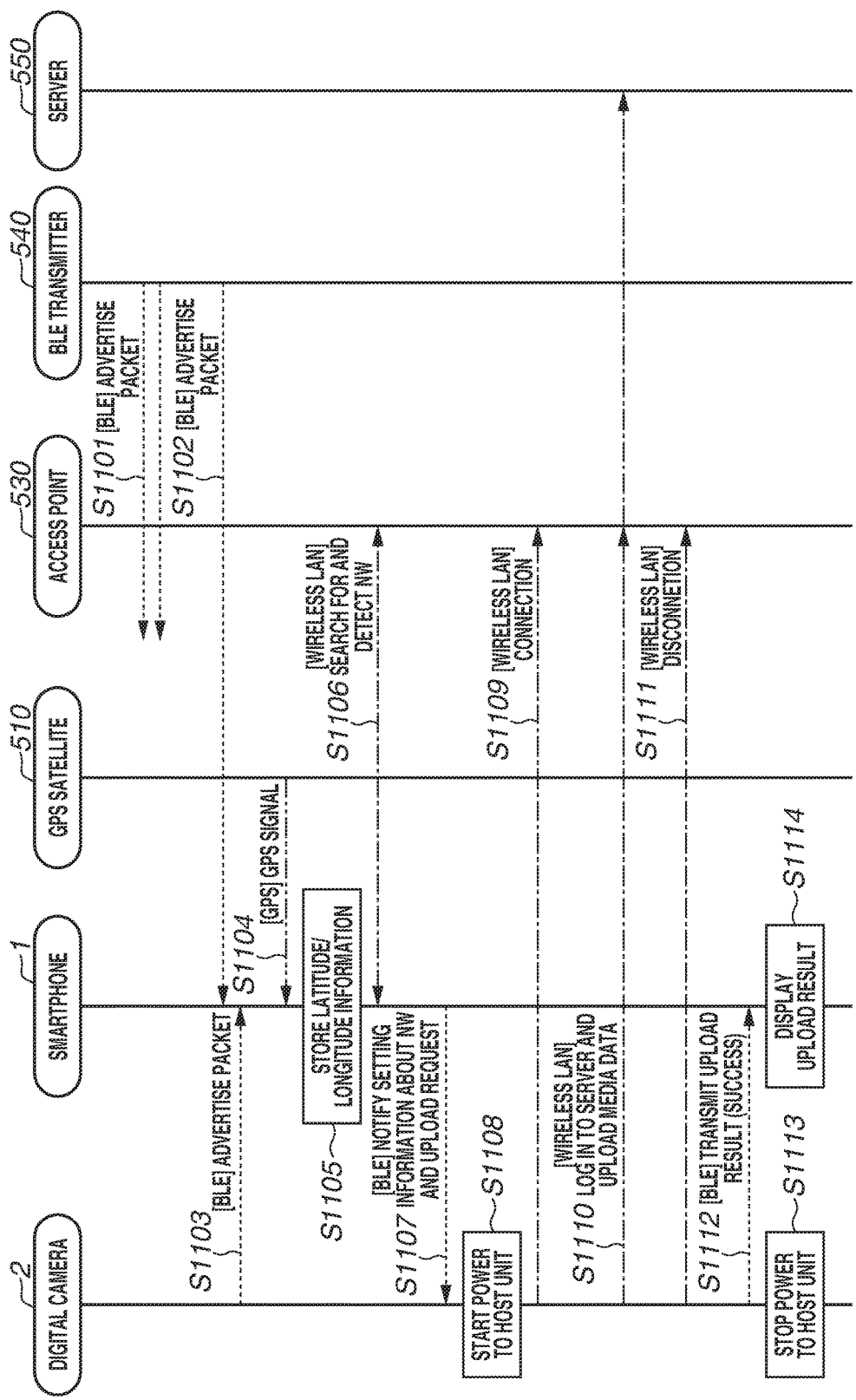
FIG. 11 is a communication sequence chart between the apparatuses.

FIG. 11 illustrates a communication sequence when a user has come home with a smartphone and a digital camera.

The BLE transmitter 540 is installed at a user's home. In step S1101, the BLE transmitter 540 periodically broadcasts (reports) a BLE Advertise packet including its own UUID. When the user comes home, the smartphone enters a BLE transmission zone of the BLE transmitter 540, so that, in step S1102, the BLE control unit 320 in the smartphone receives the BLE Advertise packet transmitted by the BLE transmitter 540. The BLE control unit 420 in the digital camera periodically receives the BLE Advertise packet regardless of whether the power to the digital camera is turned on.

The BLE control unit 320 in the smartphone starts to search for a BLE Advertise packet that is transmitted by the digital camera when being triggered by the receiving of the BLE Advertise packet. In step S1103, the BLE control unit 320 detects the BLE Advertise packet. In step S1104, the position estimation unit 350 in the smartphone then receives the GPS signal 153 that is transmitted by the GPS satellite 110. In step S1105, the position estimation unit 350 calculates latitude/longitude from the received GPS signal 153. In step S1106, the wireless LAN control unit 310 in the smartphone searches for and detects a wireless LAN network generated by the AP 112. In step S1107, the BLE control unit 320 notifies the digital camera of setting information about the network and an upload request using BLE. In step S1108, the digital camera turns on the power when the BLE control unit 420 receives the notification in step S1107. In step S1109, the wireless LAN control unit 410 in the digital camera then connects to the wireless LAN network generated by the AP 112 using the setting information that has been received in step S1107. In step S1110, the upload processing unit 430 in the digital camera then performs processing for logging in to the server 121 and processing for uploading media data via the wireless LAN network to which the wireless LAN control unit 410 has connected in step S1109. In step S1111, the wireless LAN control unit 410 disconnects from the wireless LAN network generated by the AP 112 when the upload processing is completed. In step S1112, the BLE control unit 420 in the digital camera then transmits an upload processing result to the smartphone via BLE communication. In step S1113, the BLE control unit 420 stops the power to the Host unit 10. In step S1114, the BLE control unit 320 in the smartphone displays, when receiving the upload processing result in step S1112 from the digital camera, the result on the output unit 205.

FIG. 12 illustrates a communication sequence when a user has entered the user's home with a smartphone and a digital camera. An operation sequence when the AP 112 at the user's home cannot be used is illustrated in FIG. 12, unlike in FIG. 11.

Processes in steps S1201 to S1205 are similar to those in steps S1101 to S1105, and hence description thereof is not repeated.

In step S1206, the wireless LAN control unit 310 in the smartphone searches for a wireless LAN network generated by the AP 112 after acquiring latitude/longitude information. However, the wireless LAN control unit 310 cannot detect the wireless LAN network generated by the AP 112. In step S1207, the public control unit 330 in the smartphone checks communication with a portable base station 520. In step S1208, the smartphone then displays on the output unit 205 a message for asking the user if the user wishes to perform automatic upload using a tethering function. In step S1209, the wireless LAN control unit 310 in the smartphone generates a wireless LAN network as a base station when the user performs an operation for permitting the use of the tethering function, and the tethering control unit 340 in the smartphone starts tethering (relay) processing between wireless LAN communication and public communication. In step S1210, the BLE control unit 320 in the smartphone then notifies the digital camera of setting information about the wireless LAN network, which has been generated in step 1209, and an upload request. In step S1211, the digital camera turns on the power when the BLE control unit 420 in the digital camera receives the notification in step S1210. In step S1212, the wireless LAN control unit 410 in the digital camera then connects to the wireless LAN network notified from the smartphone using the setting information that has been received in step S1210. In step S1213, the upload processing unit 430 in the digital camera then performs processing for logging in to the server 121 and processing for uploading media data via the wireless LAN network to which the connection has been established in step S1212. In step S1214, the wireless LAN control unit 410 in the digital camera disconnects from the wireless LAN network generated by the smartphone when the upload processing is completed. In step S1215, the BLE control unit 420 in the digital camera then transmits an upload processing result to the smartphone via BLE communication. In step S1216, the BLE control unit 420 stops the power to the Host unit 10. In step S1217, the smartphone displays, when the BLE control unit 320 in the smartphone receives the upload processing result in step S1215 from the digital camera, the result on the output unit 205. In step S1218, the wireless LAN control unit 310 in the smartphone ends the wireless LAN network, and the tethering control unit 340 in the smartphone stops tethering (relay) processing between wireless LAN communication and public communication.

In such a manner, the external apparatus (the digital camera) can be connected to the wireless network at a predetermined location while power consumption is reduced. Further, the user can automatically update the media data captured by the digital camera without a need for a user to perform a specific operation. Therefore, the power consumptions in the smartphone and the digital camera can be reduced while the media data such as captured image data can be automatically uploaded. Therefore, usability can be improved.

With the upload automatically performed at the user's home, the frequency that the wireless LAN communication and the tethering function are used outside the user's home can be reduced and the possibility that the smartphone and the digital camera run out of battery in an unchargeable environment such as a place the user is visiting can be reduced as a result.

If the registered external wireless LAN network cannot be detected, the user is automatically notified of the upload using the tethering function. With this configuration, the possibility that the media data is not uploaded can be reduced even when the external AP, which generates the wireless LAN network, is at fault.

When the notification is issued to the user via the smartphone in the above described exemplary embodiment, the message is displayed on the output unit 205. However, aspects of the present invention are not limited thereto. For example, the user is notified by sound or vibration. Particularly when the message is displayed to the user, the user can detect that the automatic upload using the AP 112 at the home cannot be performed without seeing the smartphone when notified of the message together with the sound and the vibration.

Figure 8:
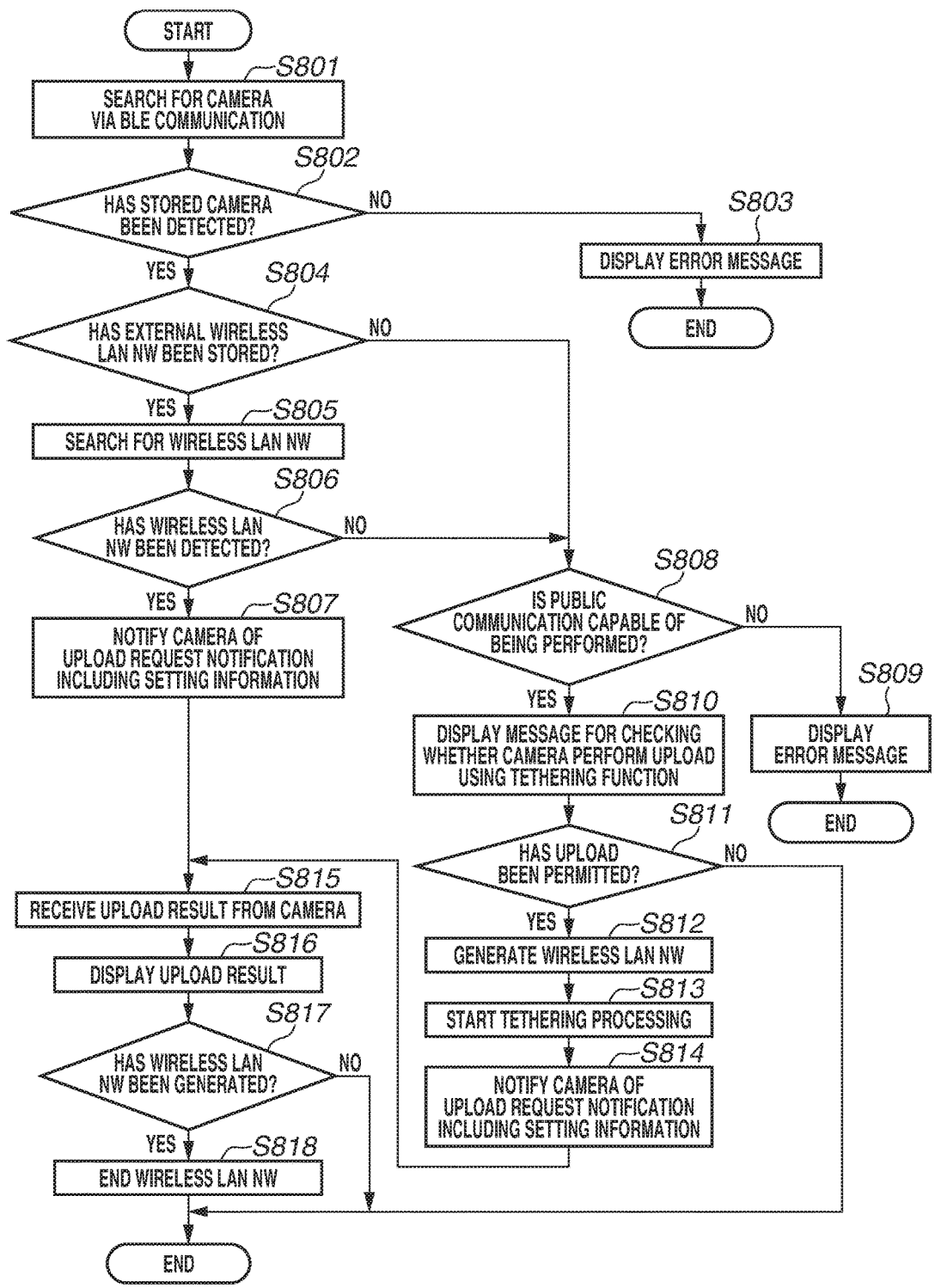
FIG. 8 is a flowchart implemented by the communication apparatus.

While the smartphone determines, according to a user's operation, whether the tethering function can be used in FIG. 8, aspects of the present invention are not limited thereto. The user may previously set whether the tethering function can be used. The smartphone may automatically determine whether the tethering function can be used based on a residual battery capacity of the smartphone and a public communication environment.

Figure 9:
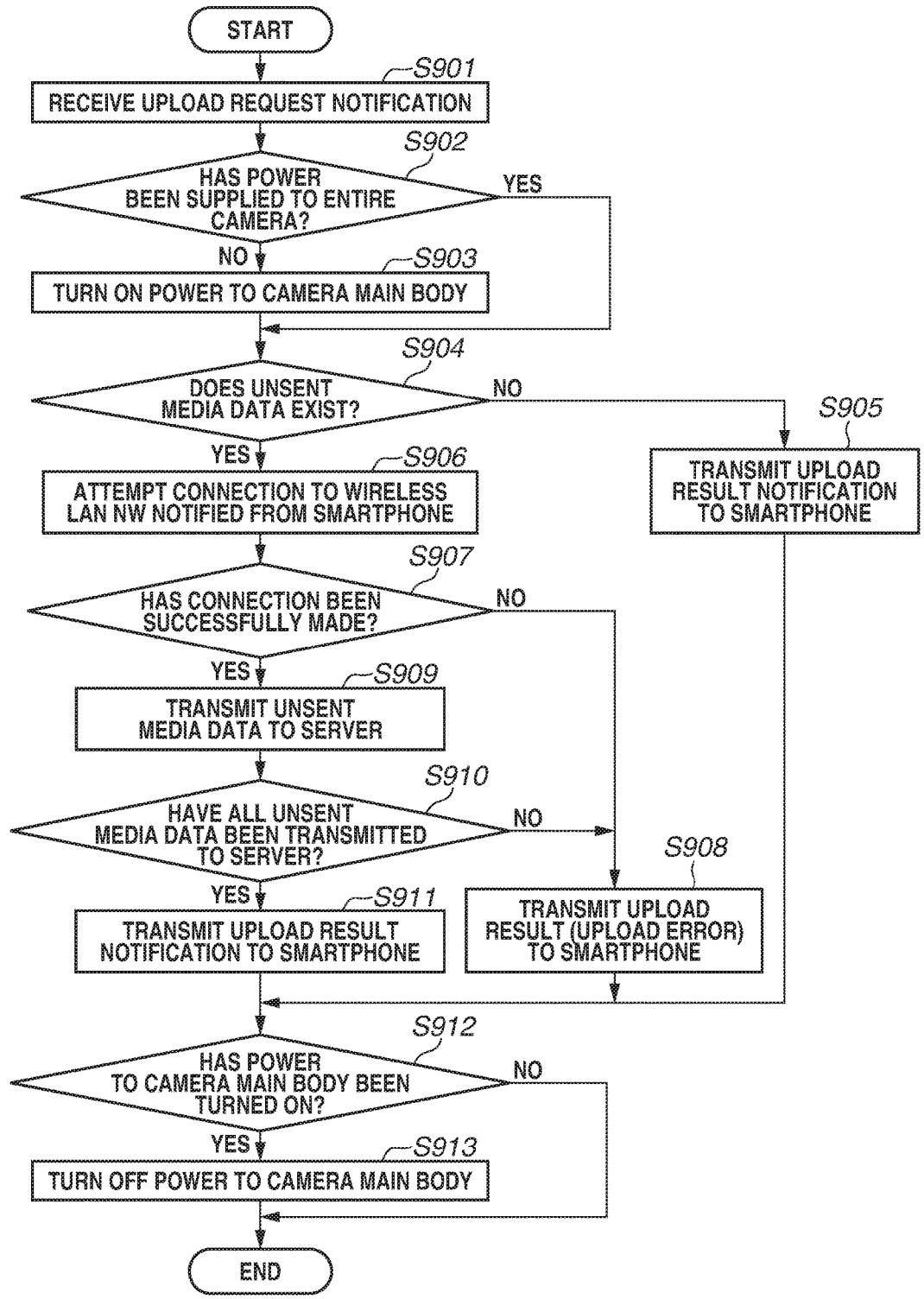
FIG. 9 is a flowchart implemented by the other-communication apparatus.

In FIG. 9, the digital camera determines whether the upload processing is to be performed depending on whether the media data that has not been transmitted to the server 121 exists. However, aspects of the present invention are not limited thereto. The residual battery capacity of the digital camera may be measured, and the upload processing is performed only when a value of the residual battery capacity is a predetermined value or more.

In the above-described exemplary embodiment, the second communication apparatus 102 uploads the media data. However, aspects of the present invention are not limited thereto. The second communication apparatus 102 may notify the setting information to download desired data from the Internet.

In the above described exemplary embodiment, a single position is registered, and when the smartphone enters a predetermined range including the registered position, the setting information notification is transmitted. However, aspects of the present invention are not limited thereto. A plurality of positions may be registered. In such a case, the setting information has been stored in association with position information such as latitude/longitude information. In such a manner, the smartphone can notify the digital camera of the setting information corresponding to the position. Further, the wireless network and the position information to be automatically connected to each other are associated with each other. Therefore, the possibility that the smartphone is connected to an unintended wireless LAN network can be also reduced.

In the above-described exemplary embodiment, the setting information notification is transmitted in response to the smartphone entering the home. However, aspects of the present invention are not limited thereto. The setting information may be previously transmitted to another communication apparatus via BLE, and the smartphone may be instructed to connect to the wireless LAN network in response to entering the home.

While BLE has been described above as an example of a first communication method for implementing an aspect of the present invention, aspects of the present invention may be implemented using a communication method other than the first communication method. Aspects of the present invention may be implemented via communication conforming to a communication standard such as Zigbee®, Radio Frequency for Consumer Electronics (RC4CE), or Wireless Universal Serial Bus (USB).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present exemplary embodiment, another communication apparatus can simply connect to the wireless LAN network at a predetermined location while power consumption is reduced. The present exemplary embodiment has one or some of the plurality of effects described above.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

What is claimed is:

1. A communication apparatus comprising:
   a detection unit configured to detect a position of the communication apparatus;
   a determination unit configured to determine that the communication apparatus exists within a first range including a position corresponding to first position information based on a result of detection performed by the detection unit; and
   a transmission unit configured to transmit a first signal, for triggering a connection process to connect another communication apparatus to a first wireless network conforming to Institute of Electrical and Electronic Engineers (IEEE) 802.11 series, to the other communication apparatus using a second communication conforming to a first other communication system different from the IEEE 802.11 series and consuming a lower power than a first communication conforming to the IEEE 802.11 series, in a case where the determination unit determines that the communication apparatus exists within the first range.

2. The communication apparatus according to claim 1, further comprising:
   a storage unit configured to store the first position information according to a user operation.

3. The communication apparatus according to claim 2, wherein the storage unit is configured to store the first position information and information about the first wireless network in association with each other.

4. The communication apparatus according to claim 2, further comprising:
   a connection unit configured to connect to the first wireless network, wherein the first position information corresponds to a position of the communication apparatus in a case where connection to the first wireless network by the connection unit is successfully established.

5. The communication apparatus according to claim 1, wherein the first signal includes information about the first wireless network.

6. The communication apparatus according to claim 5, wherein the information about the first wireless network includes at least one of an identifier, an encryption system, an encryption key, and an authentication system of the first wireless network.

7. The communication apparatus according to claim 1, further comprising:
   a first search unit configured to search for the first wireless network in a case where the determination unit determines that the communication apparatus exists within the first range.

8. The communication apparatus according to claim 7, wherein the transmission unit is configured to not transmit the first signal to the other communication apparatus even when the determination unit determines that the communication apparatus exists within the first range in a case where the first wireless network is not detected by a search by the first search unit.

9. The communication apparatus according to claim 7, further comprising:
   a generation unit configured to generate a second wireless network different from the first wireless network as a base station,
   wherein the transmission unit is configured to transmit a second signal, for triggering a connection process to connect the other communication apparatus to the second wireless network, to the other communication apparatus using the second communication in a case where the first wireless network is not detected by a search by the first search unit.

10. The communication apparatus according to claim 9, further comprising:
    a communication unit configured to communicate with an external apparatus using a second other communication system different from the IEEE 802.11 series and different from the first other communication system: and
    a relay unit configured to relay communication between the other communication apparatus and the external apparatus using the communication unit in a case where the communication apparatus is connected to the other communication apparatus via the second wireless network.

11. The communication apparatus according to claim 10, wherein the transmission unit is configured to not transmit the second signal even when the first wireless network is not detected by the first search unit, in a case where the communication apparatus is unable to communicate with the external apparatus via the communication unit.

12. The communication apparatus according to claim 1, wherein the communication apparatus is configured to request the other communication apparatus to upload data using the first signal.

13. The communication apparatus according to claim 1, wherein the detection unit is configured to detect the position of the communication apparatus using a Global Positioning System.

14. The communication apparatus according to claim 1, wherein the detection unit is configured to detect the position of the communication apparatus using wireless communication conforming to Bluetooth®.

15. The communication apparatus according to claim 1, further comprising:
    a second search unit configured to search for the other communication apparatus using the first other communication system in a case where the determination unit determines that the communication apparatus exists within the first range; and
    a notification unit configured to notify a user of an error in a case where the other communication apparatus is not detected by the second search unit.

16. The communication apparatus according to claim 1, wherein the first other communication system is a wireless communication system conforming to Bluetooth Low Energy (BLE).

17. The communication apparatus according to claim 1, wherein the communication apparatus is a smartphone and the other communication apparatus is a digital camera.

18. The communication apparatus according to claim 1, further comprising:
  an acquisition unit configured to acquire information about a result of a predetermined process performed by the other communication apparatus that has received the first signal and has connected to the first wireless network; and
  a notification unit configured to notify a user according to the information about the result of the predetermined process acquired by the acquisition unit.

19. The communication apparatus according to claim 1, wherein the first signal further turns on a power of the other communication apparatus.

20. The communication apparatus according to claim 1, wherein the detection unit detects latitude and longitude of the communication apparatus.

21. A method for controlling a communication apparatus comprising:
  detecting a position of the communication apparatus;
  determining that the communication apparatus exists within a first range including a position corresponding to first position information based on a result of the detecting; and
  transmitting a first signal, for triggering a connection process to connect another communication apparatus to a first wireless network conforming to Institute of Electrical and Electronic Engineers (IEEE) 802.11 series, to the other communication apparatus using a second communication conforming to a first other communication system different from the IEEE 802.11 series and consuming a lower power than a first communication conforming to the IEEE 802.11 series, in a case where the determination unit determines that the communication apparatus exists within the first range.

22. A non-transitory computer readable storage medium storing a program for causing a processor to execute a process for controlling a communication apparatus, the method comprising:
  detecting a position of the communication apparatus;
  determining that the communication apparatus exists within a first range including a position corresponding to first position information based on a result of the detecting; and
  transmitting a first signal, for triggering a connection process to connect another communication apparatus to a first wireless network conforming to Institute of Electrical and Electronic Engineers (IEEE) 802.11 series, to the other communication apparatus using a second communication conforming to a first other communication system different from the IEEE 802.11 series and consuming a lower power than a first communication conforming to the IEEE 802.11 series, in a case where the determination unit determines that the communication apparatus exists within the first range.

* * * * *